United States Patent [19]
Owston et al.

[11] 3,873,640
[45] Mar. 25, 1975

[54] ADHESIVE BONDING OF POLYVINYL CHLORIDE AND OTHER SYNTHETIC RESIN SUBSTRATES

[75] Inventors: William J. Owston, Edinboro; Dennis D. Howard, Girard, both of Pa.

[73] Assignee: Lord Corporation, Erie, Pa.

[22] Filed: Mar. 26, 1973

[21] Appl. No.: 343,667

Related U.S. Application Data

[63] Continuation-in-part of Ser. No. 246,201, April 21, 1972, abandoned.

[52] U.S. Cl........... 260/859 R, 156/331, 252/188.3, 260/77.5 TB, 260/77.5 BB, 260/885, 260/77.5 CR, 260/77.5 AN
[51] Int. Cl............................................ C08g 22/04
[58] Field of Search...... 260/77.5 TB, 77.5 BB, 885, 260/859 R; 252/188.3 R

[56] References Cited
UNITED STATES PATENTS

| | | | |
|---|---|---|---|
| 3,297,745 | 1/1967 | Fekete et al. | 260/347.4 |
| 3,425,988 | 2/1969 | Gorman et al. | 260/45.95 |
| 3,642,943 | 2/1972 | Noel | 260/22 CB |

*Primary Examiner*—M. J. Welsh
*Attorney, Agent, or Firm*—Howson and Howson; William E. Hedges

[57] ABSTRACT

The adhesive bonding of synthetic resin substrates and particularly polyvinyl chloride is described employing shelf-stable, catalytically curable compositions including (A) at least one polymerizable monomer from the group including styrene, methyl methacrylate, ethyl methacrylate, n-butyl methacrylate, isobutyl methacrylate, t-butyl methacrylate, hexyl methacrylate, and ethyl hexyl methacrylate, and the like, including mixtures of these monomers and partially polymerized syrups of one or more of them; (B) an organic polyisocyanate, preferably a diisocyanate or isocyanate functional urethane capped with a hydroxy functional monomer from the group including hydroxyethyl methacrylate, β-hydroxypropyl methacrylate, allyl alcohol, vinyl alcohol and the like; (C) the reducing component of a redox catalyst polymerization system such as a tertiary amine, a metallic salt or preferably, N,N-diisopropanol-p-toluidine and, optionally, (D), a polymerizable monomer or polymer; the proportions of (A), (B), (C) and (D) in the composition being about 10 to 90% (A), about 90 to 10% (B), about 0.04 to 4% (C) and, optionally, about 0 to about 20% of (D); said composition being adapted to cure rapidly at room temperature on contact pressure alone to produce an environmentally stable bond between synthetic substrates by the addition of the oxidizing component of the redox catalyst system, such as benzoyl peroxide, to the catalytically curable composition or by the application of that composition over a coating of a lacquer containing the oxidizing component previously applied to the substrate.

27 Claims, No Drawings

ADHESIVE BONDING OF POLYVINYL CHLORIDE AND OTHER SYNTHETIC RESIN SUBSTRATES

CROSS REFERENCE

This application is a continuation-in-part of our copending U.S. Pat. application Ser. No. 246,201, filed Apr. 21, 1972, now abandoned.

BACKGROUND OF THE INVENTION

It is well-known that the adhesive bonding of synthetic plastic materials presents difficult problems and that such bonding of polyvinyl chloride either to itself or to other substrates is particularly difficult, especially when the polyvinyl chloride is plasticized. Flexible, plasticized polyvinyl chloride (PVC) is difficult to bond for a number of reasons. First, it tends to concentrate peel stresses unevenly in the glue line of the adhesively bonded article. Also, inasmuch as the plasticizer tends to migrate out of flexible PVC on aging, it may enter the adhesive layer and adversely affect its performance, or may simply accumulate at the PVC-adhesive interface in a structurally weak layer. Adhesives used to bond flexible PVC articles must, of course, be flexible themselves to withstand the repeated flexing of the article in use. Of no lesser importance, is the fact that a suitable adhesive for bonding synthetic resin substrates must be able to withstand the environmental conditions of humidity, heat and cold to which the bonded article will be subjected in use. In general, a suitable adhesive for plasticized polyvinyl chloride should retain its flexibility and bonding integrity in the presence of variable amounts of moisture and humidity at temperatures from as low as about −40°F. up to as high as about 210°F.

THE PRIOR ART

Many existing solvent-based thermoplastic adhesives suitable for use in bonding PVC require exacting bonding procedures such as joining the parts during a very short time after application of the adhesive. Other available adhesives for PVC require a solvent flash-off operation followed by a heat-pressure cycle in order to achieve a suitable bond. Most available adhesives which can be cured at ambient temperatures require from several hours to several days to develop strengths approaching the ultimate levels to be expected and thus do not lend themselves to mass production techniques. In order to obtain adhesive bonds in PVC articles with available adhesives which will resist extreme environments, it is generally necessary to use a series of different adhesive layers which is, of course, inconvenient, inefficient and expensive. Available thermosetting adhesives such as the epoxy types, are also disadvantageous since barrier costs of acrylic lacquers or the like are required to prevent migration of plasticizer from flexible PVC into the adhesive layer.

The state of the art for adhesives suitable for synthetic resin substrates is represented by the adhesive compositions of U.S. Pat. No. 2,894,932 which provide substratefailing bonds on a variety of synthetic plastics including polystyrene, acrylonitrile-butadiene-styrene (ABS) and even rigid polyvinyl chloride. Even these adhesive compositions, when used to bond flexible polyvinyl chloride, however, provide bonds with a peel strength of less than about 10 psi.

Noel U.S. Pat. No. 3,642,943 issued February 15, 1972, describes a coating for vinyl substrates for blocking migration of plasticizer from the substrate into the coating which is a mixture of polyurethane prepolymer and a copolymer of an acrylic monomer and an adduct of an organo diisocyanate and a hydroxyalkyl acrylic monomer. This material has better adhesive proporties for vinyl substrate than the polyurethane prepolymer alone and provides a clear, high gloss coating having good abrasion and solvent resistance. This material, while showing good adhesion for vinyl substrates is not adapted for bonding one substrate to another.

U.S. Pat. No. 2,958,704 discloses the preparation of an adduct of an organo diisocyanate and a hydroxyalkyl acrylic compound, and suggests copolymerization of the adduct with other vinyl monomers, including acrylic acid and methacrylic acid esters. U.S. Pat. No. 3,297,745 discloses related reactions in which, however, two mols of the hydroxyl acrylic compound are reacted with one mol of the diisocyanate.

Other prior art of interest includes U.S. Pat. No. 3,895,950, and particularly U.S. Pat. Nos. 3,043,820 and 3,425,988, which relate to sealant compositions based on mono or difunctional acrylic capped isocyanate monomers for the most part. Examples III and VII of the latter patent, however, also disclose products of the reaction of toluene diisocyanate with decamethylene glycol adipate and propoxylated bis-phenol-A, respectively, which are then capped with hydroxy ethyl methacrylate (HEMA). The product of Example III, which was a viscous liquid, was dissolved in isobutyl methacrylate prior to the addition of the hydroperoxide initiator and quinone inhibitor necessary in the compositions of these patents.

U.S. Pat. Nos. 2,894,932; 2,981,650; and 3,321,351 relate to the use of acrylic modifiers and to the use of redox catalysts systems including tertiary amines and organic peroxides such as benzoyl peroxide in rapid curing adhesive compositions.

U.S. Pat. No. 3,532,652 relates to pressure sensitive adhesives based on a combination of an organic polyisocyanate with an acrylic interpolymer containing a functional monomer having an active hydrogen atom which is reactive with isocyanato groups.

British Pat. No. 1,147,732 relates to adhesives including hydroxy ethyl methacrylate (HEMA) capped isocyanateacrylic compositions curable at room temperature.

While it is apparent that compositions containing various mixtures of acrylic materials with diisocyanates and urethanes capped with hydroxyl functional monomers, are old in the art, and that a variety of adhesives have been suggested for use with synthetic resin substrates including polyvinyl chloride, a need still exists in the art for an adhesive composition for bonding flexible plasticized polyvinyl chloride to itself or to other substrates.

It is, therefore, a primary object of the present invention to provide a shelf-stable, easily applied composition which is curable in a short time at room temperature under contact pressure alone to provide a bond between a synethetic resin substrate and itself or another material, the resulting bond being environmentally stable and retaining its flexibility and impact resistance over a wide temperature range.

More particularly, it is an object of the invention to provide a shelf-stable, catalytically curable composition which can be used to bond polyvinyl chloride to itself or another material under contact pressure at room temperature in a short time to provide a bonded article in which the bond retains its impact resistance and integrity in the presence of varying amounts of moisture or humidity over a temperature range from about −40°F. up to about 210°F.

It is a particular object of the invention to provide such a composition which is capable of providing such a strong dependable and stable bond between plasticized polyvinyl chloride and itself or another substrate.

It is another object of the invention to provide such compositions which, while curing in short periods of time, have sufficiently long gel times to permit ease of application, and which do not require heating to remove solvent or heat and pressure to obtain a suitable bond.

It is still another object of the invention to provide adhesive compositions for plasticized polyvinyl chloride which do not require a barrier coat to preclude penetration of the adhesive layer or weakening of the bond by migration of plasticizer from the polyvinyl chloride.

It is yet another object of the invention to provide compositions having a prolonged shelf-life which contain polymerizable materials and the reducing component of redox catalyst system and which are curable at room temperature to provide adhesive bonds between vinyl substrates on admixture with the oxidizing component of the catalyst system or upon contact with a coating on the substrate containing the oxidizing component.

It is still another object of the invention to provide such compositions which can be stored in any suitable container without the necessity of elaborate precautions to either exclude moisture or maintain contact with air to prevent curing of the composition.

The foregoing and other objects will become apparent from the following description of the invention.

SUMMARY OF THE INVENTION

The present invention relates to the adhesive bonding of synthetic resin substrates and particularly polyvinyl chloride substrates employing shelf-stable, catalytically curable compositions including (A) at least one polymerizable monomer from the group including styrene, methyl methacrylate, ethyl methacrylate, n-butyl methacrylate, isobutyl methacrylate, t-butyl methacrylate, hexyl methacrylate, and ethyl hexyl methacrylate, and the like, including mixtures of these monomers and partially polymerized syrups of one or more of them; (B) a polyisocyanate, preferably a diisocyanate or isocyanate functional urethane capped with a hydroxy functional monomer containing at least one unit of polymerizable alpha-beta olefinic unsaturation, preferably from the group including hydroxyethyl methacrylate, β-hydroxypropyl methacrylate, allyl alcohol, vinyl alcohol and the like; and (C) the reducing component of a redox catalyst polymerization system such as a tertiary amine, a metallic salt or preferably, N,N-diisopropanol-p-toluidine; the proportions of (A), (B) and (C) in the composition being about 10 to 90% (A), about 90 to 10% (B) and about 0.04 to 4% (C); said composition being adapted to cure rapidly at room temperature on contact pressure alone to produce an environmentally stable bond between synthetic substrates by the addition of the oxidizing component of the redox catalyst system, such as benzoyl peroxide, to the catalytically curable composition or by the application of that composition over a coating of a lacquer containing the oxidizing component previously applied to the substrate.

Component (A), as noted above, may be an unpolymerized but polymerizable monomer or mixture of monomers but is preferably a partially polymerized syrup of one or more of the monomers containing both polymer and unpolymerized monomer. Component (A) may, therefore, contain from 0 up to about 50% of polymer, including copolymers if derived from more than one monomer. While component (A) may be present in the composition in amounts from about 10% up to about 90%, for most purposes it is preferred to employ about 25 to about 75% of this material.

Component (B) is present in amounts from about 90 to about 10%, preferably in amounts of about 75 to about 25% for most purposes. The polyisocyanates from which component (B) is derived include the preferred diisocyanates, such as 2,4-tolylene diisocyanate, 2,6-tolylene diisocyanate and mixtures thereof (TDI); 4,4'-diphenylmethane diisocyanate; hexamethylene diisocyanate; 4,4'-methylene bis (cyclohexyl isocyanate), m-phenylene diisocyanate and other aliphatic and aromatic diisocyanates and mixtures thereof. Other polyisocyanates useful in the invention include polymethylene polyphenyl isocyanate (available from the Upjohn Company as "PAPI") and other commercially available polyisocyanates.

The isocyanate functional urethanes useful in the present invention are well-known and are available in many forms depending upon the principal reactants (polyisocyanate and polyol) used in their preparation. Basically they are adducts or condensation products of an organo polyisocyanate and a polyol in a ratio to provide over 1 to about 3 or 4 isocyanate groups per hydroxyl group of the polyol so that the product will contain free, unreacted isocyanate (—NCO) groups. The preferred isocyanate functional urethanes have an isocyanate to hydroxyl ratio of about 2 to 1, or lower.

The polyol used in preparing the isocyanate functional urethanes will generally have an average molecular weight of from about 300 to about 3,000. Since the polyol component may be made up of a mixture of different polyols having different molecular weights, a minor proportion of the polyol component may have a molecular weight below 300 and a minor proportion may have a molecular weight above 3,000. Suitable polyols include polyalkylene glycols such as polyethylene glycols, polypropylene glycols and polyethylene-propylene glycols; polyetherpolyols such as those prepared by the addition polymerization of ethylene oxide and/or propylene oxide and a polyol like trimethylol propane in a ratio to provide unreacted hydroxyl groups in the product; organic hydroxylated elastomers exhibiting second order glass transition temperatures below about 5°C., such as poly(butadiene-styrene) polyols and poly(butadiene) polyols; polyesterpolyols such as those prepared by copolymerizing low molecular weight polyols like mono-, di- or triethylene or propylene glycol, trimethylolpropane, trimethylolethane or 1,4-butanediol, with a polycarboxylic acid like phthalic, terephthalic, adipic, maleic or succinic acid, in a ratio to provide unreacted hydroxyl groups in the product; glyceride esters of hydroxylated fatty acids, like castor oil, hydrogenated castor oil, glycerol monoricinoleate, glycerol diricinoleate, blown drying oils (e.g. blown linseed oil or blown soya oil); and the have a viscosity suitable for coating substrates to be bonded to other surfaces. The monomer of component (A) acts as a reactive diluent-solvent for the viscous to semi-solid component (B) prior to catalysis. Otherwise, component (B) may be too viscous for use as an adhesive. Such shelf-stable compositions are catalyzed for use either by incorporating the oxidizing component of the redox polymerization catalyst into the composition just prior to use, or by applying the composition to be cured over an undercoat containing the oxidizing component previously applied to the substrate. The oxidizing agent may be any suitable material known for this purpose including acyl peroxides such as benzoyl peroxide, lauroyl peroxide, nuclearly chlorinated benzoyl peroxide and the like. The preferred oxidizing agent for use in the present invention is benzoyl peroxide which may be employed in any suitable manner. For example, the benzoyl peroxide may be added to the composition to be cured as a paste containing 50% benzoyl peroxide in butyl benzyl phthalate. Such a paste is suitable added in an amount of about 3% of the composition to be cured giving an effective concentration of oxidizing agent of about 1.5%. The level of oxidizing agent may, however, vary from about 0.1 to about 6%, depending upon the hardening time desired and/or specific composition to be catalyzed. Handleable bonds are obtained in about 5 to about 60 minutes after catalysis. The workable pot life is generally about 70% of the hard time. These cures or hard times are measured at ambient temperature or about 70°F. A suitable shelf-stable coating composition, for application to a substrate as a catalyzing undercoat, may contain the oxidizing agent, such as benzoyl peroxide in any suitable film-forming vehicle.

DETAILED DESCRIPTION OF THE INVENTION

The invention will now be described in greater detail in the following specific examples. All percentages in these examples and elsewhere herein are by weight of the total composition.

EXAMPLE I

To a suitable reaction vessel equipped with stirrer, thermometer, dry air purge, and Dean Stark trap and condenser, were charged 1.0 mole of polycaprolactone triol, molecular weight average of 540, (PCP-0300 available from Union Carbide Corp.), 0.65 mole of polycaprolactone diol, average molecular weight of 2,000, (PCP-0240 available from Union Carbide Corp.) and sufficient methyl methacrylate monomer to give a non-volatile content of 80% after all ingredients had been added. A known excess of methyl methacrylate monomer was added and the contents of the reaction vessel heated to boiling with stirring and dry air purge. The excess methyl methacrylate monomer was removed along with any water present in the reaction vessel, as methyl methacrylate and water form a low boiling azeotrope. The temperature was lowered to 60°C. and 4.3 moles of toluene diisocyanate added to the reaction vessel. The temperature was maintained at 70°-80°C. until all -OH groups had been reacted (about 2 hours), yielding -NCO terminated urethane dissolved in the methyl methacrylate monomer. 4.3 moles of hydroxy ethyl methacrylate (HEMA) were then added to the reaction vessel and the temperature held at 70°-80°C. until all -NCO had been reacted (about 2 hours). A slight excess (about 10%) HEMA may be added to facilitate completion. Dibutyl tin dilaurate or stannous octoate catalyst may also be used.

An 80% solution of HEMA capped polyurethane resulted, dissolved in methyl methacrylate monomer. This HEMA capped urethane was cooled and used in making the following adhesive:

| | Ingredient | Parts By Weight |
|---|---|---|
| (B) | HEMA capped urethane | 10. |
| (A) | Methyl methacrylate monomer | 58. |
| (A) | Butyl methacrylate monomer | 15. |
| (D) | Methacrylic acid monomer | 5. |
| (D) | Medium molecular weight polymethyl methacrylate polymer, "Acryloid" A-11 (available from Rohm and Haas Co.) | 10. |
| (D) | Fumed silica, "Cab-o-sil" H-5, (available from Cabot Corp.) | 3. |
| (C) | Dimethyl-p-toluidine | 0.4 |
| | Hydroquinone | 0.01 |

After blending and agitating the ingredients until a complete, clear solution was obtained, the adhesive was used to bond nylon fabric-reinforced plasticized vinyl strips to steel and polycarbonate plastic sheeting. Low carbon steel coupons 0.50 mm thick were cut to 1 × 2 ¾inch sections. The polycarbonate sheet stock was one-eighth inch thick and was cut into 1 × 3 inch coupons. Such stock is available as mold-extruded sheet made from such trademarked plastics as "Lexan" (available from General Electric Corp.), or "Merlon" (available from Mobay Chemical Co.). Prior to bonding, the vinyl surfaces were wiped with a cloth saturated with isopropyl alcohol to remove residual oils and plasticizers. The adhesive was catalyzed with a 55% benzoyl peroxide paste dispersion in butyl benzylphthalate. The amount used to catalyze was 4% by weight, admixed with 100 parts of adhesive resin. The catalyzed adhesive was brushed onto the metal and polycarbonate bond surfaces with similar sized strips of reinforced vinyl pressed onto the adhesive to complete the test composite. The glue line thickness was measured and found to range between 1 and 45 mils in thickness. After storage at 72°F. for 30 minutes, during which time the adhesive fully hardened, the test assemblies were destructively delaminated using a commercially available tester machine. The 180° peeling force required to delaminate the vinyl from the steel strip averages 18 lbs. per linear inch (pli), resulting in a failure between the vinyl and the reinforcing nylon fabric core. A similar test with the vinyl to steel assembly yielded 28 lbs. (pli). A layer of vinyl was left on the adhesive surface after failure of the assembly occurred.

EXAMPLE II

The procedure of Example I was followed except 2.0 moles of polyoxypropylene glycol, molecular weight average of 1000, (PPG-1025 available from Union Carbide Corp.) were used instead of 1.0 mole of polycaprolactone triol, molecular weight average of 540 (PCP-0300 available from Union Carbide Corp.) and 0.65 mole polycaprolactone diol, molecular weight average of 2000, (PCP-0240, available from Union Carbide Corp.), as in Example I, and 3 moles of TDI, (an 80:20% mixture of 2,4-ditolylene diisocyanate to 2,6-ditolylene diisocyanate) were added to the reaction vessel after removal of the azeotrope, instead of 4.3 moles. When all -OH had reacted, 2.0 moles of HEMA like; and polyester polyols prepared by the polymerization of a lactone such as epsilon caprolactone. A small amount of a low molecular weight polyhydric compound like 1,3-butanediol, may be included. The organic hydroxylated elastomers having second order glass transition temperatures below about 5°C. are preferred, and those skilled in the art will recognize that elastomers of this type other than the especially preferred poly(butadiene) polyols and poly(butadiene-styrene) polyols may be employed, since there is no limitation on the identity of such elastomers so long as they have the requisite polyol functionality and low glass transition temperature and are otherwise suitable for use in the particular adhesive being formulated with regard to molecular weight, viscosity and compatibility with the other ingredients.

The organo polyisocyanates used in preparing the isocyanate functional urethanes generally are cyclic in nature and contain at least two isocyanate groups. Examples of such polyisocyanates are 2,4-tolylene diisocyanate, 2,6-tolylene diisocyanate, a mixture of 2,4- and 2,6-tolylene diisocyanate known as TDI, m- and p-phenylene diisocyanate, phosgenated aromatic diamines, 1,5-naphthalene diisocyanate, 3,3'-bitolylene-4,4'-diisocyanate, diphenylmethane-4,4'-diisocyanate, isophorone diisocyanate, methyl cyclohexyl diisocyanate, and 4,4'-methylene bis (cyclohexyl isocyanate). Mixtures of polyisocyanates may be used.

The preferred material for component (B) is derived from an isocyanate functional urethane prepared from epsiloncaprolactone polyol, 2,4-tolylene-diisocyanate urethane which is subsequently capped with hydroxyethyl methacrylate (HEMA). The materials of component (B) are prepared by mixing the appropriate polyisocyanate, including isocyanate functional urethanes, with an amount of the appropriate hydroxy functional monomer such that the OH:NCO ratio is at least 1:1, and heating the mixture from above room temperature up to about 130°C. The reaction generally takes place in a dry non-reactive compatible monomer such as styrene, methylmethacrylate or the like under a dry atmosphere. The reaction is continued until all isocyanate groups are eliminated.

For additional information as to the diisocyanates and isocyanate functional urethanes useful in the present invention see the Kirk-Othmer *Encyclopedia of Chemical Technology*, second edition, Volume 21, pages 56 through 106, inclusive, under "Urethane Polymers".

The various elastomers operable in the present invention, both of the polyol type referred to above as a part of the isocyanate functional urethane (B) and others referred to hereinafter as useful as component (E), have a second order glass transition temperature below about 5°C. Such second order glass transition temperatures are measured dilatometrically or by differential thermal analysis by any of the methods described in "Standard Methods of Chemical Analysis," *Instrumental Analysis*, sixth edition, Volume IIIB, edited by Frank Welcher.

Component (C), is the reducing component of any suitable redox polymerization catalyst system and may be employed in any suitable amount from about 0.04 to about 4%, and preferably about 1%. Suitable reducing components for incorporation in the shelf-stable compositions include metal salts such as cobalt naphthenate, ferric chloride or other compounds such as vanadium pentoxide. Other suitable reducing components include the tertiary amines such as diethanol-p-toluidine, diethyl-p-toluidine, dimethyl-p-toluidine, ethanol ethyl-m-toluidine, di-n-butylol-p-toluidine, tetramethyldiamino-diphenylmethane, diacetic acid ester of diethylol-p-toluidine, N-t-butylol-N-methyl aniline and diethyl-p-toluidine, or mixtures thereof. The amines used for this purpose should be non-sensitive to oxidation by air and are preferably used in conjunction with acyl peroxides as the oxidizing component of the catalyst. The preferred reducing component is N,N-diisopropanol-p-toluidine which will be referred to hereinafter simply as diisopropanol-p-toluidine. Other known reducing components of redox catalysts may also be employed.

The basic compositions comprising components (A), (B) and (C) can be supplemented with additional materials in amounts from 0 up to about 20%, based upon the total composition, to improve the environmental resistance of the adhesive compositions, or for other reasons. Suitable additives (D) include polymerizable monomers such as acrylic acid and methacrylic acid, acrylates such as ethyl acrylate and ethyl hexyl acrylate, and polyfunctional monomers such as diethylene glycol dimethacrylate, trimethylolpropane trimethacrylate, pentaerythritol triacrylate, divinyl benzene, and the like. Suitable polymeric additives include polystyrene, polymethylmethacrylate, and other similar polymers and copolymers.

Other suitable polymeric additives (E) include elastomeric polymers of the class having a second order glass transition temperature below about 5°C. These materials are useful for modifying the room temperature flexibility of the adhesive bonds achieved by the compositions of the invention. Of the wide variety of compatible elastomers of this class which are operable in the invention, several are especially preferred. Among these are polychloroprene (Neoprene rubber); polybutadiene, and butadiene copolymer rubbers such as acrylonitrile-butadiene, carboxylated acrylonitrile-butadiene, and styrene-butadiene rubbers; polyacrylate rubbers such as ethyl acrylate, and ethyl acrylate-halogenated vinyl etheracrylic acid; and ethylene copolymers such as ethylene-vinyl acetate. Many other elastomeric polymers of the class having a second order glass transition temperature below about 5°C. may be employed since, other than the low glass transition temperature, there are no other limitations on the identity of the elastomer used for this purpose, except, of course, for the specific requirements of the particular adhesive being formulated as will be obvious to those skilled in the art, e.g., suitable molecular weight, viscosity characteristics and compatibility with the other ingredients of the adhesive.

Still other conventional additions may be included such as paraffin, fumed silica, fillers, extenders, pigments, and the like.

Stabilizers for the compositions may be added in suitable amounts from about 0.001 to about 1%. Suitable materials for this purpose include compounds containing active hydrogen such as hydroquinones, benzoquinones, mercaptans and the like; hydroquinone being preferred, at a concentration of about 0.015%.

The shelf-stable, catalytically curable compositions of the invention containing components (A), (B), (D), optionally one or more components and or (E) and a stabilizer such as hydroquinone, are compounded to were added and the cook continued until all -NCO was reacted.

| | Ingredient | Parts By Weight |
|---|---|---|
| (B) | Acrylic ester urethane [1] | 90. |
| (A) | Methyl methacrylate monomer | 8.5 |
| (D) | Diethylene glycol dimethacrylate | 1.0 |
| (C) | Diisopropanol-p-toluidine | 0.5 |
| | Hydroquinone | 0.001 |

[1] Compensated for the prepared concentration of 80% in methyl methacrylate monomer.

The above ingredients were blended together in a vessel until a clear solution was obtained. The adhesive thus prepared was then catalyzed with 2% of a benzoyl peroxide paste. The catalyzed adhesive was poured onto and spread evenly over 1 inch square bond areas of polycarbonate sections 1 × 3 × ⅛inch in size and polysulfone coupons ½× 4 × ¼inch in size. Equal size sections of the plastics were pressed onto the adhesive coated bond areas forming an overlap assembly with an overlap area of one inch. The glue lines were measured and found to range between 0.05 and 75 mils in thickness. One specific composite was prepared using a glue line of 200 mils in thickness using polycarbonate sections. After storage for one hour, the bonded assemblies were destructively tested by shearing. All plastic substrates failed outside the glue line area, leaving a thin layer of plastic on the hardened glue surfaces. The strengths ranged from 480 to 850 psi, averaging 530 psi for the polycarbonate and 650 psi for the polysulfone stock. The adhesive had hardened to yield a structural bond within 6 minutes at 72°F. after catalyzing.

Example III

| | Ingredient | Parts By Weight |
|---|---|---|
| (A) | Methyl methacrylate | 40 |
| | Ethyl hexyl methacrylate | 32 |
| | Methacrylic acid (Partially polymerized to a viscosity of 16,000 cps.) | 7 |
| (B) | Hydroxy ethyl methacrylate-capped urethane derived from a polyether polyol (MW410) and 2,4-tolylene diisocyanate (—NCO:OH ratio of 2:1) | 20 |
| (C) | Diisopropanol-p-toluidine | 1 |
| | Hydroquinone | 0.015 |
| | about | 100 |

Employing the above ingredients and proportions, component (A) was prepared by mixing the ingredients in an air purged reaction vessel at a temperature of 80°C. in the presence of 0.01% azoisobutyric acid dinitrile. After a period of 35 minutes, 0.01% hydroquinone was added to the hot syrup, followed by cooling to 70°F. The resulting syrup had a viscosity of about 16,000 cps. The syrup was comprised of monomers and partially polymerized polymer.

Component (B) was prepared in a manner similar to the acrylic capped urethane of Example I.

The diisopropanol-p-toluidine and hydroquinone were added to the blended mixture followed by agitation to obtain a clear adhesive solution.

The resulting composition is unexpectedly shelf-stable for a liquid unsaturated composition, and is stable during storage for prolonged periods of more than one year.

A commercially available shelf-stable paste containing about 50% benzoyl peroxide in butyl benzyl phthalate ("Cadox B-159" available from Cadet Chemical Corp.) was added to the composition of Example III in a concentration of about 3% by weight. The catalyzed adhesive was applied by a conventional technique to thin strips of plasticized polyvinyl chloride of 60 durometer hardness and joined with one-half inch overlap and a glue line of about 10 mils thickness. The strips were joined with contact pressure alone and allowed to stand at room temperature. About 75% of the ultimate strength of the resulting bonds was achieved in about 30 minutes. After hardening for 24 hours, the one-half inch overlap and 180° peel overlay laminate test assemblies were tested by conventional procedures at various speeds and it was observed that the polyvinyl chloride stock failed outside of the bonded area in all cases. The strength of the adhesive bonds, therefore, exceeded the strength of the PVC substrate.

EXAMPLE IV

The general procedure of Example I was repeated with the following ingredients:

| | Ingredient | Parts By Weight |
|---|---|---|
| (A) | Methylmethacrylate | 35 |
| | Ethyl hexyl methacrylate | 15 |
| | Methacrylic acid | 5 |
| (B) | Hydroxyethyl methacrylate-terminated epsilon-poly-caprolactone polyol (diol and triol) /TDI urethane (—NCO/OH ratio of 2:1) | 45 |
| (C) | N,N-Diisopropanol-p-toluidine | 1 |
| | Hydroquinone | 0.015 |
| | about | 100 |

The composition of this example, in which component (B) is the same as that in Example I, after incorporating 3% by weight of 50% benzoyl peroxide paste, was employed to self-bond plasticized PVC to itself employing 10 mil glue lines as before. After setting for two hours at room temperature, a 180° peel delamination test was conducted and failure occurred within the PVC substrate rather than in the adhesive bond.

In additional tests with the composition of Example IV, plasticized vinyl strips were laminated to cowhide leather, acrylonitrile-butadiene-styrene (ABS), rigid PVC and pine wood substrates. After setting at room temperature for two hours, each of these laminates was subjected to a destructive peel test. In each case failure occurred within one of the laminated materials rather than in the adhesive bond. Therefore, the adhesive bonds were stronger than a laminated material in all cases.

Strips of polyvinyl chloride containing external plasticizers such as dioctyl phthalate were bonded in laminate form with contact pressure alone at room temperature using the catalyzed composition of Example IV. After being permitted to cure for 24 hours, at room temperature, two sets of strips were subjected to accelerated aging for 3 weeks, one at 100°F. and one at 180°F., respectively. After this aging process, the previously flexible vinyl strips were rigid from loss of the plasticizers. However, destructive peel tests still resulted in failure of the vinyl stock outside of the adhesively bonded area.

Another set of test strips bonded as above was immersed in boiling water for a period of 8 hours. Peel tests on the boiled strips conducted at 70°F. also resulted in failure in the polyvinyl chloride substrate and not in the bonded area.

Still another set of test strips bonded as above was exposed to 100% relative humidity at 120°F. for a period of 30 days. Destructive, room temperature tests of these strips produced the same result, i.e., failure in the PVC substrate but not in the adhesive bond.

Another set of similarly bonded strips was tested by heating in air for 10 minutes at 200°F. with the same result on destructive testing at both room temperature and 200°F.

Example V

| | Ingredient | | Parts By Weight |
|---|---|---|---|
| (A) | Methyl methacrylate | | 60 |
| (B) | Hydroxy ethyl methacrylate-terminated poly-epsilon-caprolactone polyol (PCP-0300) TDI urethane, 2:1 ratio of NCO:OH | | 40 |
| (C) | Diisopropanol-p-toluidine | | 1 |
| | Hydroquinone | | 0.015 |
| | | about | 100 |
| | "Cab-o-sil" fumed silica filler | | 2 |
| | Oxidizing component | | 2 |

Component (B) was prepared in a similar manner to the acrylic capped urethane of Example I.

Laminates were made composed of plasticized vinyl bonded to itself, ABS, and polystyrene, After two hours, the laminants were destructively tested using a peel test. Failure occurred within the vinyl or plastic instead of the bond area in all cases.

Example VI

| | Ingredient | | Parts By Weight |
|---|---|---|---|
| (A) | Methyl methacrylate | | 22.46 |
| | Methacrylic acid | | 7.24 |
| (B) | Hydroxyethyl methacrylate-capped urethane, derived from a polyether polyol (MW410) and 2,4-tolylene diisocyanate (—NCO:OH ratio of 2:1) | | 10.2 |
| (C) | N,N,diisopropanol-p-toluidine | | 1.32 |
| (D) | Polymethylmethacrylate, "Plexiglas" V(811), available from Rohm & Haas Co. | | 19.25 |
| | Polychloroprene-acrylic syrup | | 39.60 |
| | Dihydroxy, dichloro-p-benzoquinone | | 0.009 |
| | | about | 100 |

The general procedure of Example I was followed employing the above ingredients. Component (B) was the same as in Example III.

The polychloroprene-acrylic syrup referred to above was prepared by partial polymerization of a mixture of monomers and polychloroprene as follows: methylmethacrylate 80 parts, monostyrene 10 parts and polychloroprene 4 parts. Using a free radical source, azodiisobutyric acid dinitrile, the mixture was polymerized to a viscosity of 18,000 cps at 21°C. and cooled and stabilized by the addition of 0.015% hydroquinone.

The resulting curable composition when catalyzed with about 3% of a 50% benzoyl peroxide paste, was found to provide effective bonds between plasticized PVC and metal.

EXAMPLE VII

This example illustrates the use of an elastomer as a co-ingredient (D) in the adhesive compositions of the invention. The inclusion of an elastomer, or rubbery polymer with a second order transition temperature below about 5°C., as noted above, has been found to be means to obtain very high flexibility and improves the toughness of the cured adhesive. The bonding of assemblies which require resistance to very high impact, flexing fatigue, cleavage or peeling stress can be effectively accomplished with these elastomer-acrylic urethane based adhesives. The 5°C. second order glass transistion region is about the top effective area since the rubbery polymer must act as a flex improving agent at temperatures from slightly below room temperature (which is about 20°C.) to temperatures much above room temperatures. When polymers with second order transition temperatures above about 5°C. are used, properties of lower flexibility and elongation are obtained, although adhesion is approximately the same as compositions containing glassy polymers with glass transition temperatures above room temperature, such as in Example VI, physical properties such as elongation at yield and flexibility are much improved with the rubber additive. Preferred elastomers are chosen from those which are somewhat lower than the 5°C. are since temperatures below 5°C., perhaps as low as −20°C., are encountered in special, but practical uses, such as for exterior locations in northern climates. Limitations also exist for the elastomer co-ingredient in that suitable molecular weights must be chosen to reflect the desired viscosity of the adhesive or the concentration required to meet specific flexibility requirments. Other requirements will also be obvious to those skilled in the art, such as using an elastomer in a specific instance that is compatible with other polymers and co-ingredients of the adhesive.

The adhesive formulations include several different rubbers to demonstrate the interchangeability of specific compatible elastomers in combination with the acrylic urethane to provide adhesives which are extremely flexible when cured:

| | Parts By Weight | | | |
|---|---|---|---|---|
| | A | B | C | D |
| Medium molecular weight acrylonitrile-butadiene rubber, Mooney viscosity of 45-70, second order glass transition temperature of approximately −25°C., (Hycar 1052) [1] | 7 | | | |
| Medium molecular weight, carboxylated acrylonitrile-butadiene rubber, Mooney viscosity of 42-62, second order glass transition temperature of approximately −20°C., (Hycar 1072) [2] | | 7 | | |

| | Parts By Weight | | | |
|---|---|---|---|---|
| | A | B | C | D |
| Medium molecular weight styrene-butadiene rubber, Mooney viscosity of 35, second order glass transition temperature of approximately −25°C., (Krylene 1515 EP) [3] | | | 7 | |
| Carboxylated ethyl acrylate copolymer rubber, solution grade elastomer, second order glass transition temperature of approximately −15°C. (S-Lec SA-110L) [4] | | | | 7 |
| Methyl methacrylate | 62 | 62 | 62 | 62 |
| Methacrylic acid | 8.2 | 8.2 | 8.2 | 8.2 |
| Hydroxyethyl methacrylate-capped urethane derived from a polyether polyol (M.W. 1010) and 2,4 tolylene diisocyanate (−NCO:OH ratio of 2:1) same as Example II | 22 | 22 | 22 | 22 |
| N,N diisopropanol-p-toluidine | 1.1 | 1.1 | 1.1 | 1.1 |
| Hydroquinone | 0.01 | 0.01 | 0.01 | 0.01 |

[1] Available from B. F. Goodrich Chemicals Co.
[2] Available from B. F. Goodrich Chemicals Co.
[3] Available from Polysar, Inc.
[4] Available from Sekisui Products, Inc.

The above adhesives were formulated as described above, catalyzed with 3% of the aforementioned benzoyl peroxide paste, and employed to bond 1 × 4 × ⅛ inch strips of ABS plastic (Cycolac T) together, using a one inch single overlap test joint with a 20 mil thick glue line. One set of strips were tested, after the adhesive hardened for two hours, by shearing on a testing machine. The destructive tests yielded failures by fracture within the plastic while the bonded joints remained intact. The bonded assembly strengths averaged 95 percent of the tensile strength at yield of the ABS plastic tested on the same testing machine. Results are contained in the following table:

Example

| Tensile overlap shear strength of assembly or section | | | | |
|---|---|---|---|---|
| Adhesive Composition | | | | 1"×4"×⅛" Unbonded |
| VII A | VII B | VII C | VII D | ABS Strip |
| 695 lbs. | 675 lbs. | 715 lbs. | 685 lbs. | 723 lbs. |

The elastomer-containing adhesives exhibited such high flexibility that the joint was not rigidified and caused to prematurely fracture at a lower strength than that approximately of the tensile strength of the thermoplastic at its yield point.

Several of the bonded assemblies using VII A adhesive were subjected to an impact test of 20 ft.-lbs. with a Gardner impact tester, using a    inch diameter mandrel. The bonded joint remained intact without the adhesive or joint area fracturing or separating.

Catalyzed portions of the adhesives were also cast into sheets 20 mils in thickness and stored for 24 hours. One-half inch strips of the castings were cut for testing of tensile-elongation properties. The elongation-at-break measurements of the cast adhesive films demonstrate the flexibility of the cured adhesives:

| Adhesive | Tensile Strength At Yield (Break) | Percent Elongation Of Film |
|---|---|---|
| VII A | 5400 psi. | 22% |
| VII B | 5400 psi. | 18% |
| VII C | 4200 psi. | 24% |
| VII D | 3800 psi. | 12% |

To test the flexing fatigue resistance of the cured adhesive, a 20 mil thickness film of adhesive VII A was cut into a one inch by 6 inch strip. The strip was folded double and creased in a metal vise. The creasing failed to fracture the film, which, in addition, remained intact when tested for tensile strength until a 15% elongation occurred and a 4,100 psi. force was applied to the creased adhesive strip.

EXAMPLE VIII

This example demonstrates the use of hydroxylated elastomeric polymers as the base polyol used in the preparation of the acrylic urethane. By including an elastomeric polyol, the adhesive may be further flexibilized without resort to additive elastomers or plasticizers. As specific examples, two butadiene polymers were utilized to prepare adhesives to illustrate the practice of the technique:

The procedure of Example I was followed for the preparation of the hydroxyethyl methacrylate (HEMA) capped polybutadiene based polyurethane. To the reactor was charged 1.0 mole of hydroxyl functional polybutadiene, MW = 2900, (ARCO Polybd liquid resin R-15M), and the methyl methacrylate monomer. After drying the mixture by azeotrope distillation, 2.0 moles of TDI, 348 gms., were added and the reaction continued until 2.0 equivalent weights of −NCO remained unreacted. 2.0 moles of HEMA were then added to the reactor and the reaction continued until all −NCO had been consumed. A viscous resin solution resulted. The resinous mixture was used to prepare an adhesive as noted below. The formula used was VIII A.

To prepare an acrylic urethane based upon a copolymer elastomer, a specific butadiene-styrene copolymer was used as the polyol portion of the base urethane prepolymer.

The use of a copolymer, in addition to a typical homopolymer, illustrates the wide diversity of elastomer bases which are operable in preparation of the acrylic urethane compositions. The procedure of Example I was also used for the preparation of acrylic capped butadiene-styrene copolymer based polyurethane. To the reactor was charged 1.0 mole of the hydroxyl functional copolymer, MW = 3080, (ARCO Polybd Liquid Resin CS-15), and the methyl methacrylate monomer. After drying, 2.0 moles of tolylene diisocyanate (TDI), 348 gms., were added and the reaction continued until 2.0 equivalent of —NCO remained unreacted. 2.0 moles of HEMA were then added to the reactor and the reaction continued until all of the available —NCO had been consumed. A viscous resin solution resulted which was used as a constituent, (B), in the formulation of Example VIII B.

| | Ingredient | Adhesive Parts By Weight | |
|---|---|---|---|
| | | A | B |
| (A) | Methyl methacrylate monomer | 40 | 40 |
| | Ethyl methacrylate monomer | 10 | 10 |
| | Isobutyl methacrylate monomer | 7 | 7 |
| (B) | HEMA capped urethane derived from a polybutadiene homopolymer, polyol, MW 2900, and 2,4 tolylene diisocyanate, (—NCO:OH ratio of 2:1), 80% in methyl methacrylate | 42 | |
| (B) | HEMA capped urethane derived from a poly (butadiene-styrene) copolymer polyol, (75:25 by wt.), MW 3080, and 2,4 tolylene diisocyanate (—NCO:OH ratio of 2:1), 80% in methyl methacrylate | | 42 |
| (C) | Diethyl-p-toluidine | 0.8 | 0.8 |
| (D) | Hydroquinone | 0.005 | 0.005 |

Mixtures of VIII A and VIII B were blended thoroughly by agitation until a complete solution was obtained. The two adhesives were then used to bond articles together to form test assemblies.

Tests for VIII A and VIII B:
Sections of polycarbonate and ABS ⅛×1 ×4 were cut from sheet stock of the two plastics. Sheets of plasticized PVC and acrylic plastic were cut into 1 ×4 sections, one-eighth inch in thickness. Each adhesive was catalyzed by mixing with a phlegmatized dispersion of benzoyl peroxide, 50% in calcium carbonate powder. 100 parts of the adhesive was mixed thoroughly with 4 parts of the dispersion of benzoyl peroxide. Portions of the catalyzed adhesives were brushed onto the plastic surfaces, coating 1 inch square areas. The polycarbonate was joined to the ABS and the PVC to the acrylic plastic, forming single overlap assemblies, with a 30 mil glue line, controlled by shimming and fixturing while the adhesive was permitted to harden. After allowing the joints to harden undisturbed for 2 hours, the bonded test assemblies were tested by shearing. In all cases the assemblies failed by fracturing within the plastic substrates.

| | Adhesive Composition | |
|---|---|---|
| | A | B |
| Polycarbonate to ABS | 830 psi. | 790 psi. |
| Plasticized PVC to acrylic | 390 psi. | 385 psi. |

Substrates:
Polycarbonate: (Lexan 100 available from General Electric Company).
ABS: (Cycolac T, available from Marbon Chemical Division, Borg Warner Corporation).
Plasticized PVC was injection molding grade medium molecular weight, plasticized with dioctyl phthalate.

Example IX

| | Ingredient | Parts By Weight | |
|---|---|---|---|
| | | A | B |
| (B) | Acrylic ester urethane [1] | 28 | 28 |
| (A) | Methyl methacrylate monomer | 5 | |
| (A) | Styrene monomer | 48 | 48 |
| (D) | Ethyl hexyl acrylate monomer | 15 | |
| (D) | Ethyl acrylate monomer | | 20 |
| (D) | Acrylic acid monomer | 4 | 4 |
| (C) | Diethyl-p-toluidine | 0.5 | 0.5 |
| | t-butyl catechol | 0.01 | 0.01 |

[1] Polymer prepared according to Example II, compensated for solution concentration in methyl methacrylate.

Adhesive mixtures IX A and IX B were mixed according to the formulas and agitated until a thorough blend was obtained. Each adhesive was catalyzed by mixing the 3 percent of a benzoyl peroxide paste, 55% in dibutyl phthalate. Bonded test assemblies were formed with SAN (styrene-acrylontrile) and polycarbonate plastics. Also bonded was ABS to cold rolled steel in single overlap assemblies (Cycolac T, available from Marbon Chemical Div., Borg-Warner Corporation). After allowing bonded joints to condition and harden for 2 hours, the assemblies were destructively tested on a testing machine by shearing. The failures occurred within the respective plastic substrates with the respective strengths contained in the following table:

| Adhesive | Assembly | Strength |
|---|---|---|
| IX A | SAN/polycarbonate | 570 psi. |
| IX A | ABS/cold rolled steel | 635 psi. |
| IX B | SAN/polycarbonate | 605 psi. |
| IX B | ABS/cold rolled steel | 650 psi. |

Adhesives IX A and IX B were also catalyzed and cast into 20 mil thick sheets. After hardening, one-half inch wide strips were cut from the castings. The strips were respectively bent to decreasing radii and creased in a metal vice. The severe creasing failed to fracture or stress craze the flexible adhesive films.

The adhesive compositions of the present invention are distinguished from compositions of the prior art such as those of U.S. Pat. No. 3,425,988 in the obtainment of unusual shelf storage stability in containers in which long term exclusion of stabilizing oxygen occurs. Such exclusion of oxygen is the functional operation by which compositions of U.S. Pat. No. 3,425,988 are hardened as adhesives. Hence, by virtue of the continuous production of polymerization initiating free radicals by the incorporation of hydroperoxides, the presence of large quantities of oxygen and continuous replenishment thereof is required. Stability in such hydroperoxide and reactive, unsaturated resins is limited and requires small, oxygen permeable storage containers so that the entire portion of the resin has free access to a continuous supply of oxygen (lines 23–38, column 5, U.S. Pat. No. 3,425,988). Compositions of the present invention incorporating the components of (A), including the stable, oxidation resistant, aromatic amine, are exceptionally stable in comparison. Further, the anerobic mechanism of U.S. Pat. No. 3,425,988 limits or eliminates the incorporation of advantageous co-ingredients to permit the formulation of high performance adhesives such as the present compositions permit. The inclusion of other beneficial additives, such as polymers, can dilute the functional acrylic urethanes so that the anerobic reaction is slowed or reduced to ineffectiveness in its capability to form a hardened resin, whereas such additives can be employed with advantage in the present invention.

Owing to the unusual stability of the present compositions, much more reactive adhesives can be formulated, which, after completing the redox catalyst system by adding the oxidizing source, cure in very brief periods. Cure rates of 5 to 60 minutes are obtained, with the 5 to 10 minute hardening formulations being as unusually stable as the others of longer cure times. Such cure times permit high speed production line bonding techniques as contrasted to the slow cures of U.S. Pat. No. 3,425,988, noted on line 20, column 6, which preclude the use of those adhesives in such high speed techniques.

While the invention has been described above in connection with certain specific embodiments, those have been given by way of illustration only and are not to be construed as limiting the scope of the appended claims.

Having thus described the invention:

1. A shelf-stable composition comprising:
   A. a component selected from the group consisting of
      1. a monomer selected from the group consisting of:

styrene,
   methyl methacrylate,
   ethyl methcarylate,
   n-butyl methacrylate,
   isobutyl methacrylate,
   t-butyl methcarylate,
   hexyl methacrylate, and
   ethyl hexyl methacrylate, 2. a mixture of at least two of said monomers,
   3. a partially polymerized syrup of one of said monomers, and
   4. a partially polymerized syrup of at least two of said monomers;

B. an organic polyisocyanate capped with a hydroxy functional monomer containing at least one unit of polymerizable alpha-beta olefinic unsaturation, said capped polyisocyanate having substantially no free isocyanate functionality; and C. a reducing component of a redox polymerization catalyst;

said composition containing about 10 to about 90% of (A), about 90 to about 10% of (B) and about 0.04 to about 4% of (C).

2. A composition according to claim 1 wherein (B) is derived from a diisocyanate.

3. A composition according to claim 2 wherein the diisocyanate is 2,4-tolylene diisocyanate.

4. A composition according to claim 2 wherein the diisocyanate is a mixture of 2,4-tolylene diisocyanate and 2,6-tolylene diisocyanate.

5. A composition according to claim 2 wherein the diisocyanate is 4,4'-methylene bis (cyclohexyl diisocyanate).

6. A composition according to claim 2 wherein the diisocyanate is 4,4'-diphenylmethane diisocyanate.

7. A composition according to claim 2 wherein the diisocyanate is m-phenylene diisocyanate.

8. A composition according to claim 1 wherein (B) is derived from an isocyanate functional urethane which is derived from a polyol having an average molecular weight from about 300 to about 3,000 and an organic polyisocyanate in proportions of more than 1 and up to about 4 isocyanate groups per hydroxyl group.

9. A composition according to claim 1 wherein (B) is derived from an isocyanate functional urethane which is derived from a polyol having an average molecular weight from about 300 to about 3,000 and an organic polyisocyanate in proportions of more than 1 and up to about 2 isocyanate groups per hydroxyl group.

10. A composition according to claim 8 wherein the isocyanate functional urethane is derived from an epsilon caprolactone polyol.

11. A composition according to claim 8 wherein the isocyanate functional urethane is derived from a polyoxypropylene polyol.

12. A composition according to claim 8 wherein the isocyanate functional urethane is derived from an organic hydroxy functional elastomer having a second order glass transition temperature below about 5°C.

13. A composition of claim 12 wherein the elastomer is selected from the group consisting of poly (butadiene) polyols and poly (butadiene-styrene) polyols.

14. A composition according to claim 2 wherein the diisocyanate is capped with hydroxyethyl methacrylate.

15. A composition according to claim 3 wherein the 2,4-tolylene diisocyanate is capped with hydroxyethyl methacrylate.

16. A composition according to claim 4 wherein the mixed 2,4-tolylene and 2,6-tolylene diisocyanates are capped with hydroxyethyl methacrylate.

17. A composition according to claim 5 wherein the 4,4'-methylene bis (cyclohexyl diisocyanate) is capped with hydroxyethyl methacrylate.

18. A composition according to claim 6 wherein the 4,4'-diphenylmethane diisocyanate is capped with hydroxyethyl methacrylate.

19. A composition according to claim 7 wherein the m-phenylene diisocyanate is capped with hydroxyethyl methacrylate.

20. A composition according to claim 8 wherein the isocyanate functional urethane is capped with hydroxyethyl methacrylate.

21. A composition according to claim 10 wherein the epsilon caprolactone-derived isocyanate functional urethane is capped with hydroxyethyl methacrylate.

22. A composition according to claim 11 wherein the polyoxypropylene polyol-derived isocyanate functional urethane is capped with hydroxyethyl methacrylate.

23. A composition according to claim 13 wherein the hydroxy functional polybutadiene-derived isocyanate functional urethane is capped with hydroxyethyl methacrylate.

24. A composition according to claim 13 wherein the hydroxy functional butadiene-styrene copolymer-derived isocyanate functional urethane is capped with hydroxyethyl methacrylate.

25. A composition according to claim 1, containing in addition (D) up to about 20% by weight of an additive component selected from the group consisting of
   acrylic acid,
   methacrylic acid,
   diethylene glycol dimethacrylate,
   trimethylolpropane trimethacrylate,
   divinyl benzene
   ethyl acrylate,
   ethyl hexyl acrylate,
   polystyrene, and
   polymethyl methacrylate.

26. A composition according to claim 1, containing in addition (E) up to about 20% by weight of an additive component, consisting of a compatible organic elastomeric polymer having a second order glass transition temperature below about 5°C.

27. A composition according to claim 26, wherein said organic elastomeric polymer is selected from the group consisting of
   polychloroprene rubber,
   polybutadiene rubber,
   acrylonitrile-butadiene rubber,
   carboxylated acrylonitrile-butadiene rubber,
   styrene-butadiene rubber, and
   ethyl acrylate-halogenated vinyl ether-acrylic acid rubber.

* * * * *